US008366450B2

(12) United States Patent
Brown, Jr.

(10) Patent No.: US 8,366,450 B2
(45) Date of Patent: Feb. 5, 2013

(54) IMAGE REPRESENTATION VIEWER AND METHOD OF VIEWING

(75) Inventor: William L. Brown, Jr., Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 13/299,537

(22) Filed: Nov. 18, 2011

(65) Prior Publication Data

US 2012/0066157 A1 Mar. 15, 2012

Related U.S. Application Data

(63) Continuation of application No. 12/182,628, filed on Jul. 30, 2008, now abandoned.

(51) Int. Cl.
*G09B 25/00* (2006.01)

(52) U.S. Cl. ............... 434/371; 434/81; 434/94; 434/99

(58) Field of Classification Search .................... 434/81, 434/94, 99, 371; 446/219; 472/57
See application file for complete search history.

(56) References Cited

U.S. PATENT DOCUMENTS

| | | | | |
|---|---|---|---|---|
| 1,191,144 | A | | 7/1916 | Baldauf |
| 1,979,119 | A | | 10/1934 | Radzinsky |
| 2,085,180 | A | | 6/1937 | Bevis |
| D190,789 | S | | 6/1961 | Levis |
| 3,047,966 | A | | 8/1962 | Greenspan |
| D205,272 | S | | 7/1966 | Joseph |
| 3,861,078 | A | | 1/1975 | Snyder |
| 3,930,722 | A | | 1/1976 | Anzivino |
| 4,157,633 | A | | 6/1979 | Reiner et al. |
| 4,218,836 | A | | 8/1980 | Acres |
| 4,273,418 | A | | 6/1981 | Gillespie et al. |
| 4,660,723 | A | | 4/1987 | Dechirot |
| 4,842,141 | A | * | 6/1989 | Segal ............................ 206/462 |
| 5,160,265 | A | | 11/1992 | Kim |
| 5,358,407 | A | | 10/1994 | Lainer et al. |
| 5,619,753 | A | | 4/1997 | Van Cort |
| 5,785,528 | A | | 7/1998 | Jones-Fenleigh et al. |
| 6,598,608 | B1 | | 7/2003 | Downey |
| 2002/0196333 | A1 | | 12/2002 | Gorischek |
| 2005/0074739 | A1 | | 4/2005 | Shapiro |
| 2006/0038345 | A1 | | 2/2006 | Barthold |
| 2008/0231978 | A1 | * | 9/2008 | Pierce ........................... 359/838 |

OTHER PUBLICATIONS http://www.magneticpoetry.com/product/photo-faces/.

* cited by examiner

*Primary Examiner* — Gene Kim
*Assistant Examiner* — Joseph B Baldori
(74) *Attorney, Agent, or Firm* — Griffiths & Seaton PLLC

(57) ABSTRACT

Methods of previewing a representation of a costume are provided. The method includes removably affixing two or more cling elements to a smooth surface in a non-overlapping manner, the two or more cling elements being disposed concurrently on and directly contacting the smooth surface, and the two or more cling elements comprising a portion of the representation of the costume to allow one of the following: a first person to view a semblance of a costumed image comprising a reflection of the first person with the affixed two or more cling elements each positioned over the reflection of the first person, and a second person to view through the smooth surface a portion of the first person with the affixed two or more cling elements each positioned adjacent the portion of the first person viewed through the smooth surface. The method also includes displaying the smooth surface.

24 Claims, 3 Drawing Sheets

IMAGE REPRESENTATION VIEWER AND METHOD OF VIEWING

CROSS-REFERENCE TO RELATED APPLICATION

This application is a divisional of and claims priority to U.S. patent application Ser. No. 12/182,628, filed Jul. 30, 2008, which is incorporated herein by reference.

FIELD

The present disclosure relates generally to costume kits and in particular the present disclosure relates to costume kits using electrostatic or cohesive cling cutouts.

BACKGROUND

Costumes are popularly used for certain holidays, and for other social occasions including parties. Children enjoy playing with costumes to re-enact events, or simply to play act. Having a number of actual costumes can consume a large amount of space, as well as be quite expensive. Further, costumes are typically sized in such a manner as to make them less likely to be able to be used by more than one person, especially if the two people are of different sizes.

For the reasons stated above, and for other reasons stated below which will become apparent to those skilled in the art upon reading and understanding the present specification, there is a need in the art for elements to provide the appearance of wearing a costume.

SUMMARY

In one embodiment, a method of previewing a representation of a costume is provided. The method includes removably affixing two or more cling elements to a smooth surface in a non-overlapping manner, the two or more cling elements being disposed concurrently on and directly contacting the smooth surface. The two or more cling elements comprise a portion of the representation of the costume to allow one of the following: a first person to view a semblance of a costumed image comprising a reflection of the first person with the affixed two or more cling elements each positioned adjacent the reflection of the first person, and a second person to view through the smooth surface a portion of the first person with the affixed two or more cling elements each positioned adjacent the portion of the first person viewed through the smooth surface. The method also includes displaying the smooth surface.

BRIEF DESCRIPTION OF DRAWINGS

Embodiments of the invention will be described with respect to the figures, in which like reference numerals denote like elements, and in which.

DETAILED DESCRIPTION

Figure 1:
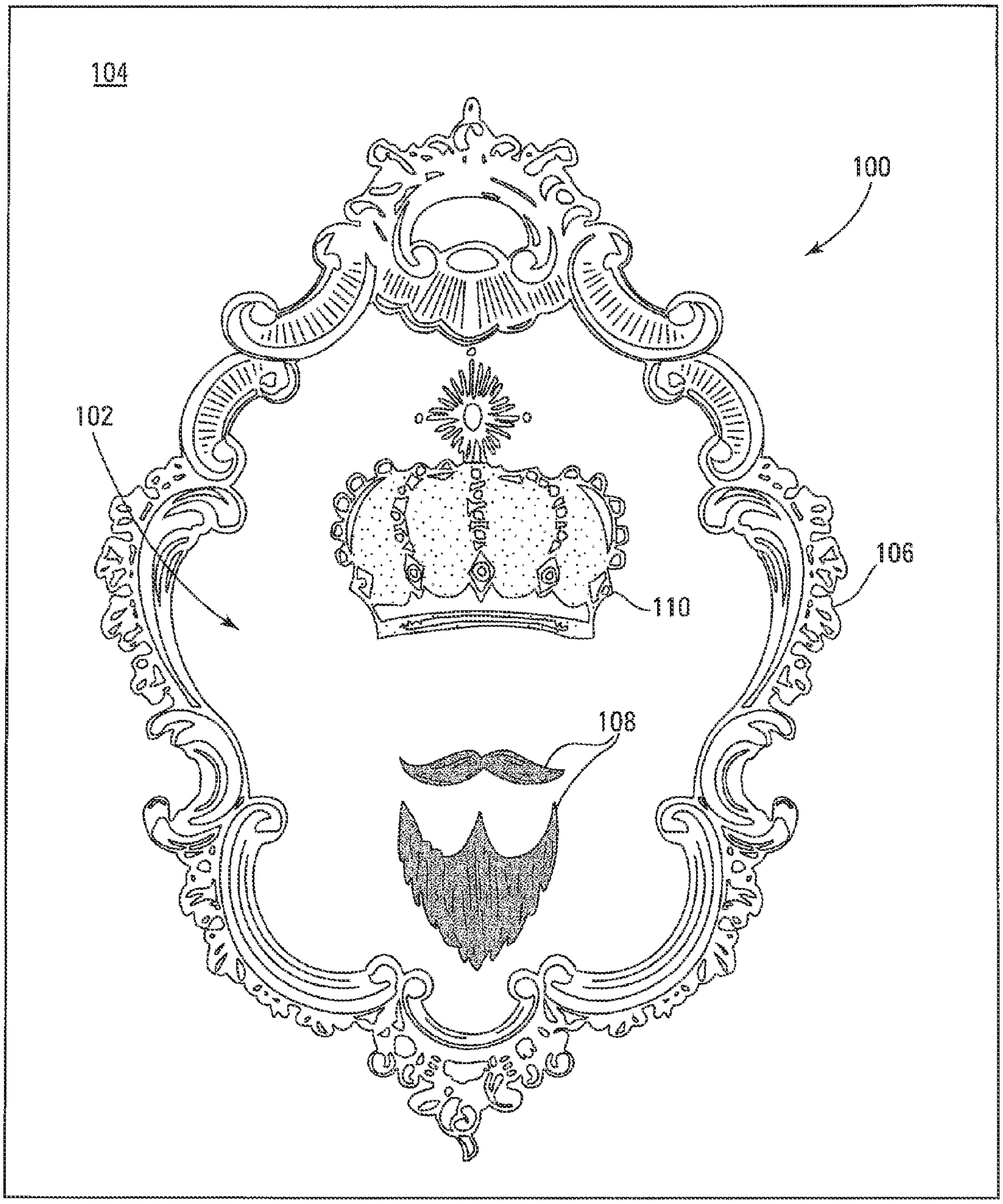
FIG. 1 is a view of a kit according to one embodiment of the present invention.

In the following detailed description of the embodiments, reference is made to the accompanying drawings that form a part hereof. In the drawings, like numerals describe substantially similar components throughout the several views. These embodiments are described in sufficient detail to enable those skilled in the art to practice the invention. Other embodiments may be utilized and material, structural, and logical changes may be made without departing from the scope of the present invention.

The following detailed description is, therefore, not to be taken in a limiting sense, and the scope of the present disclosure is defined only by the appended claims, along with the full scope of equivalents to which such claims are entitled.

Various embodiments of the present invention include apparatus and methods for previewing a costume or outfit in a mirror. Other embodiments include a kit for creating and viewing in a minor or other reflective surface a view of a user's face combined with elements of a costume. The various embodiments include a number of cling elements removably mountable to a smooth reflective surface such as a minor, the elements removably mountable using static cling or cohesive forces. For example, the cling elements may be formed of plasticized polyvinylchloride (PVC) film or electrostatically-charged oriented polypropylene (PP) film. The elements are alignable with a reflection of a user's face in the smooth reflective surface to overlay the portion or portions of the user's face in the reflection the user sees. In the reflective surface, the user sees his or her face reflected with the overlay of the cling elements, thereby showing how the user would look in a costume. The elements appear to be part of the user's reflection.

In another embodiment, the elements are used with a see-through smooth surface, such as glass, and users on opposite sides of the glass or see-through surface can see what one another would look like with faces having the overlay of cling elements. The elements appear in this embodiment to show another how a user would look in a costume having the elements.

The elements of the kit or costume are representations of features and/or adornments (such as jewelry and the like) of a face, and are used to create an overlay image that is seen as actual items on a face of a user when the features and/or adornments are movably mounted on a smooth reflective surface.

FIG. 1 is a view of one embodiment 100 of a kit for previewing a representation of a costumed face. The kit 100 comprises a number of elements 102 of facial features and/or adornments detachably mountable to a smooth reflective surface 104. The elements 102 are capable of arrangement on a reflective surface such as a mirror to allow a user to see an image (or representation) of the user's face with the elements 102 overlaying the user's image in a location on the image where an actual element represented by the elements 102 appears on the user's face. In one embodiment, the elements include a combination of at least one of a frame element 106, a facial feature element 108, and an adornment element 110. Frame elements include for example antique frame representations and modern frame representations. Facial feature elements include for example eyebrows, moustaches, beards, moles, hair styles, et cetera. Adornment elements include for example hats, crowns, jewelry, scarves, bandanas, et cetera. It should be understood that while certain representative frames, features, and adornments are listed, many other frames, features, and adornments will be evident to those of skill in the art, and that such other frames, features, and adornments are within the scope of the disclosure.

In another embodiment, the kit 100 includes a smooth reflective surface such as a mirror, on which the elements can be arranged. As one example, the smooth reflective surface may be a metalized plastic film such as aluminized polyethylene terephthalate. In this embodiment, an external smooth reflective surface is not needed for viewing the created representations of images. Instead, the user uses the provided smooth reflective surface of the kit 100. In this embodiment, frame elements may or may not be present. For example, instead of being detachably mounted, element 106 may be printed onto the reflective surface 104.

Figure 2:
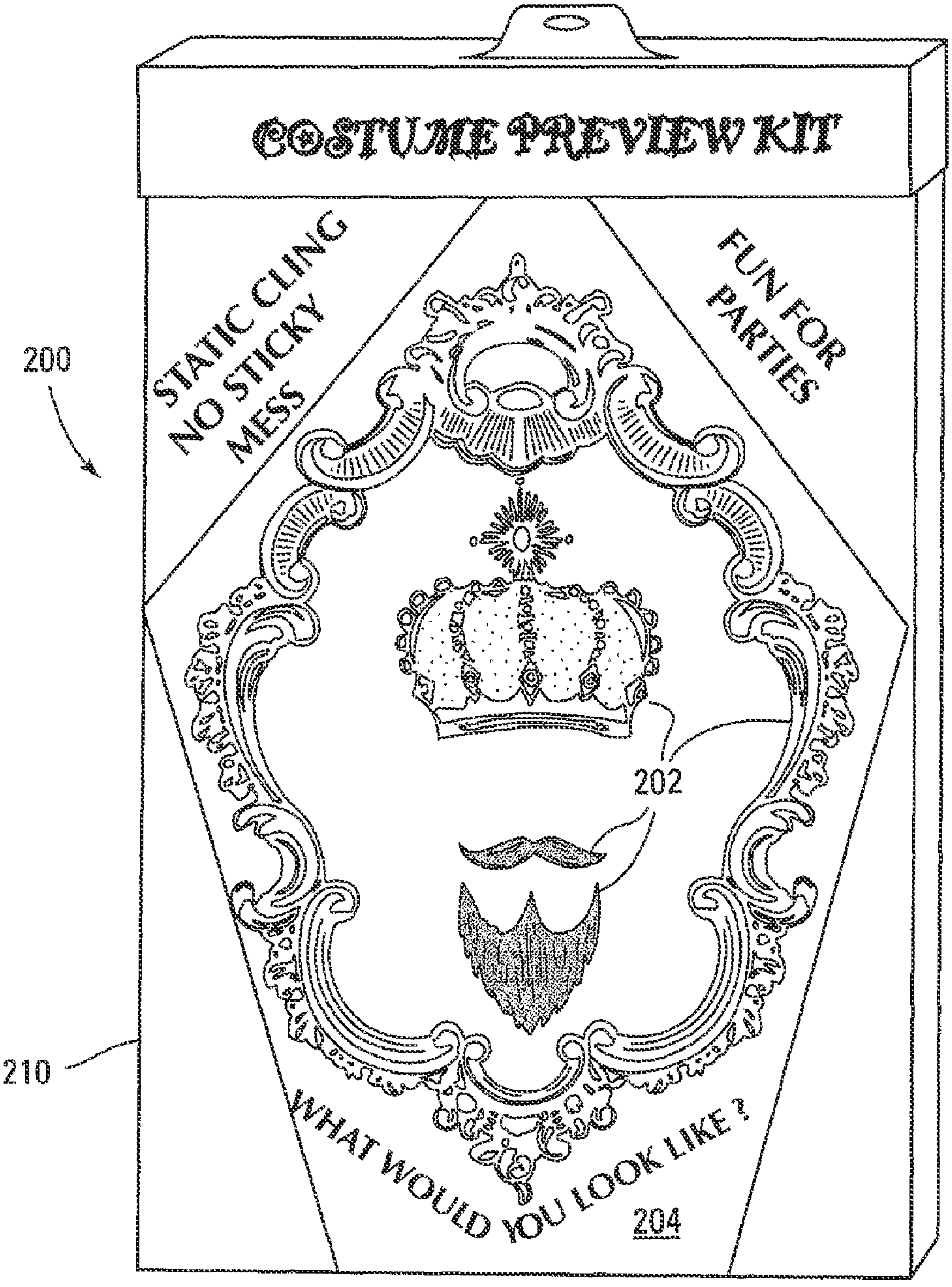
FIG. 2 is a view of a packaged kit according to another embodiment of the present invention.

In another embodiment shown in FIG. 2, a kit 200 is packaged to display, such as for retail sale, at least a portion of the elements 202 on a smooth reflective surface 204 with a see-through display package 210, such that a potential user or buyer can see the representations on a reflective surface such that when a user looks at the packaging, the displayed representation is arrayed to show how the user would look with the representations in place on the user's face.

Figure 3:
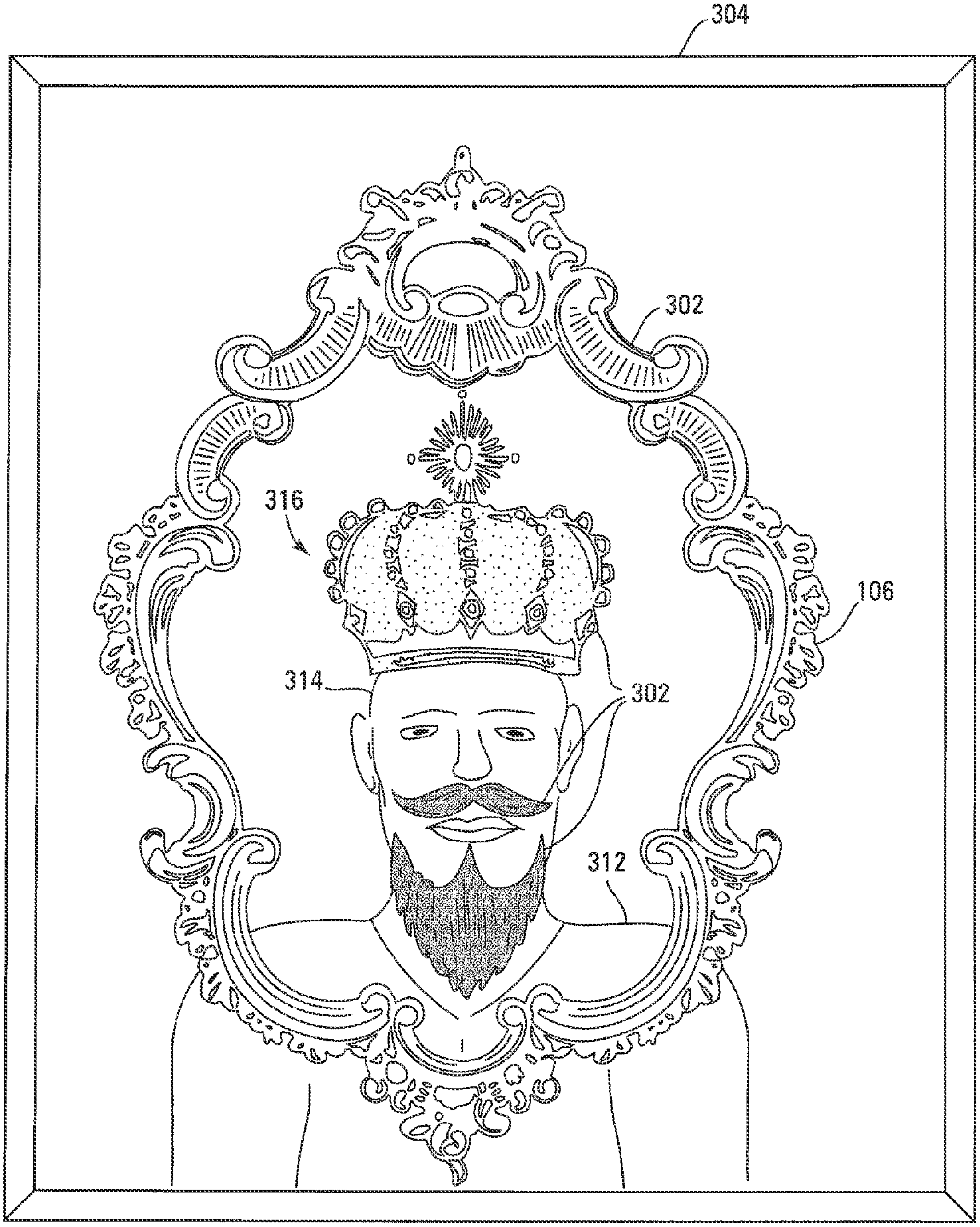
FIG. 3 is a view of a kit in use by a user according to still another embodiment of the present invention.

FIG. 3 is a view of a kit such as kit 100 in use on an external mirror 204. A user 312 arranges the elements 302 of the kit on the minor 300, then positions his or her face 314 to align his or her reflection with the elements 302. In this manner, the user 312 sees a combined image 316 representing what the user 312 looks like with the elements 302 superimposed over the reflection of the user 312.

The elements in various embodiments are coordinated so that a plurality of elements make up particular costumes or representations. The number of such coordinated costumes is nearly limitless, and additional costumes are in another embodiment packaged as add-on components to the kit. The elements include in various embodiments the features of a specific costume, including by way of example only and not by limitation, a set with a crown, moustache and beard for a king; a set with a bandana, an earring, jewelry, and a bared set of teeth for a pirate; a top hat, glasses, moustache, and bowtie for a distinguished gentleman; or a set of whiskers, a cat nose, and cat ears for a cat.

In use, the kit works as follows. A user mounts an element or set of elements on a smooth reflective surface, such as a mirror, which can be included with the kit or separate from the kit. The elements are mounted using the electrostatic or cohesive attraction feature of the material in one embodiment. The elements are aligned generally with a reflected image of the user on the mirror. That is, the elements are placed on the minor so as to be in a position to line up with the reflection a user sees when the user looks into the mirror. The elements are movable as they are mounted to the smooth reflective surface only by static or cohesive cling.

The removable nature of the elements allows multiple users to adjust the same set of elements for their own viewing, such as to arrange the features to conform to the size and shape of the individual user's face. Further, perspective can be important when previewing a representation of an image, so the removable nature of the elements allows for a user to view a representation of his or herself from different distance perspectives as well.

While static or cohesive cling are described herein as the method by which the elements are mounted to the smooth reflective surface, it should be understood that other removable mounting methods are amenable to use with the various embodiments described herein, and are within the scope of the disclosure. For example, thermoplastic adhesives may be applied to the elements to provide the necessary cling.

While the kit and representations disclosed herein have been described with respect to making a representation of a user's face, it should be understood that other body locations such as hands and arms, or legs, or the like, can also be represented with appropriate feature elements such as fingernails and the like, and appropriate adornments including by way of example only and not by way of limitation footwear, gloves, attire, or other accessories, without departing from the scope of the invention. Further, the elements may include color, glow in the dark, metallic ink, or the like.

CONCLUSION

A kit for viewing a combined image including cling mounted features and a user's own face has been described that includes a number of elements that are removably mountable to a smooth reflective surface such as a mirror. The arrangement of the elements allows a user or users to see an image of the user's face with the facial feature elements or adornments superimposed thereon.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of presenting a representation of a costume, comprising:

removably affixing two or more cling elements to a smooth surface in a non-overlapping manner using one or more of electrostatic attraction and cohesive cling, the two or more cling elements being disposed concurrently on and each directly contacting the smooth surface, and the two or more cling elements each comprising a portion of the representation of the costume;

securing the smooth surface in a package such that the package substantially encloses an outer perimeter of the smooth surface to form a packaged kit in a manner substantially hiding the outer perimeter of the smooth surface from view of a consumer viewing the packaged kit, the package including a see-through portion aligned with and exposing a portion of the smooth surface and the two or more cling elements in a manner allowing one of the following:

a first person to view a semblance of a costumed image comprising a reflection of the first person with the affixed two or more cling elements each positioned adjacent the reflection of the first person while the smooth surface is secured in the package, and a second person to view through the smooth surface a portion of the first person with the affixed two or more cling elements each positioned adjacent the portion of the first person viewed through the smooth surface while the smooth surface is secured in the package; and displaying the smooth surface in a retail store such that at least one of the first person and the second person can view the smooth surface and the two or more cling elements while the smooth surface is in the package.

2. The method of claim 1, further comprising:

repositioning one or more of the two or more cling elements on the smooth surface to differently align with one or more facial features of a third person.

3. The method of claim 1, wherein each of the two or more cling elements has a non-rectangular shape forming part of a coordinated costume.

4. The method of claim 3, wherein the two or more cling elements include one or more facial feature cling elements and one or more adornment cling elements.

5. The method of claim 4, wherein the one or more facial feature cling elements comprises an element selected from the group consisting of an eyebrow, a moustache, a beard, a mole, and a hair style.

6. The method of claim 4, wherein the one or more adornment cling elements comprises an element selected from the group consisting of a hat, a crown, a piece of jewelry, a scarf, and a bandana.

7. The method of claim 1, wherein the two or more cling elements include a crown, a moustache, and a beard to form a coordinated king costume.

8. The method of claim 1, wherein the two or more cling elements include a bandana, an earring, one or more jewelry cling elements, and a bared set of teeth to form a pirate costume.

9. The method of claim 1, wherein the two or more cling elements include a top hat, a pair of glasses, a moustache, and a bowtie to form a gentleman costume.

10. The method of claim 1, wherein the two or more cling elements include a set of whiskers, a cat nose, and a pair of cat ears to form a cat costume.

11. The method of claim 1, further comprising removably affixing one or more frame cling elements to the smooth surface to surround the two or more cling elements disposed on the smooth surface.

12. The method of claim 1, wherein the package includes instructions for the first person to one or more of the following:

affix the two or more cling elements to the smooth surface and to view the reflection of the first person with the affixed two or more cling elements each positioned adjacent the reflection of the first person, and affix the two or more cling elements to the smooth surface and to have the second person view the portion of the first person and the affixed two or more cling elements through the smooth surface.

13. The method of claim 12, further comprising shipping the package with the smooth surface and the affixed two or more cling elements to a retail store for retail sale.

14. The method of claim 1, wherein the smooth surface is formed on a mirror member, and the smooth surface is made of metalicized plastic film on the mirror member.

15. The method of claim 1, further comprising printing a substantially continuous frame on the smooth surface such that the substantially continuous frame is entirely spaced inwardly from the outer perimeter of the smooth surface and the substantially continuous frame substantially entirely surrounds the two or more cling elements when the two or more cling elements are removably affixed to the smooth surface.

16. The method of claim 1, wherein removably affixing two or more cling elements includes providing the two or more cling elements formed of one of plasticized polyvinylchloride film and electrostatically-charged oriented polypropylene film.

17. The method of claim 1, wherein the two or more cling elements are a first portion of a number of cling elements, and only the first portion of the number of cling elements are viewable through the see-through portion of the package.

18. The method of claim 1, further comprising promoting the functionality of the two or more cling elements in combination with the smooth surface.

19. The method of claim 1, wherein:

the smooth surface is formed on a mirror member, the smooth surface is made of metalicized plastic film on the mirror member, removably affixing two or more cling elements includes providing the two or more cling elements formed of one of plasticized polyvinylchloride film and electrostatically-charged oriented polypropylene film, the two or more cling elements are a first portion of a number of cling elements, and only the first portion of the number of cling elements are viewable through the see-through portion of the package, and the method further comprises:

printing a substantially continuous frame on the smooth surface such that the substantially continuous frame is entirely spaced inwardly from the outer perimeter of the smooth surface and the substantially continuous frame substantially entirely surrounds the two or more cling elements when the two or more cling elements are removably affixed to the smooth surface, and promoting the functionality of the two or more cling elements in combination with the smooth surface.

20. A method of constructing and displaying a costume previewing kit comprising:

removably affixing, using one of electrostatic attraction and cohesive cling, a first set of two or more cling elements directly to a reflective surface concurrently in a non-overlapping manner, the first set of two or more cling elements including differently shaped, non-rectangular components representing a first costume;

placing one or more frame cling elements, which are separate from the first set of two or more cling elements, on the reflective surface in a manner substantially surrounding the first set of two or more cling elements;

packaging the reflective surface and the first set of two or more cling elements and the one or more frame cling elements on the reflective surface in a display package such that the display package substantially surrounds an outer perimeter edge of the reflective surface, wherein the display package includes a see-through portion aligned with and allowing viewing of the reflective surface, the first set of two or more cling elements, and the one or more frame cling elements while the reflective surface, the first set of two or more cling elements, and the one or more frame cling elements are in the display package; and reflecting an image on the reflective surface, the image including a reflection of a user with the first set of two or more cling elements superimposed on the reflection of the user, when the user is in front of the reflective surface.

21. The method of claim 20, further comprising:

peeling off the first set of two or more cling elements from the reflective surface;

removably affixing a second set of two or more cling elements directly on the reflective surface in a non-overlapping manner representing a second costume; and reflecting an image on the reflective surface including the reflection of the user with the second set of two or more cling elements superimposed on the reflection of the user, when the user is in front of the reflective surface.

22. The method of claim 20, wherein the first set of two or more cling elements includes one or more facial feature cling elements and one or more adornment cling elements.

23. The method of claim 22, further comprising:

peeling off the first set of two or more cling elements from the reflective surface to remove the first set of two or more cling elements from the reflective surface; and removably affixing the first set of two or more cling elements to a second surface separate from the reflective surface.

24. The method of claim 20 wherein:

the reflective surface is a mirrored surface, the reflective surface is made of metalicized plastic film, removably affixing a first set of two or more cling elements includes providing each of the first set of two or more cling elements formed of one of plasticized polyvinylchloride film and electrostatically-charged oriented polypropylene film, the first set of two or more cling elements are part of a larger number of cling elements, and only the first set of two or more cling elements of the larger number of cling elements is viewable through the see-through portion of the display package, and the method further comprises:

promoting the functionality of the first set of two or more cling elements in combination with the reflective surface.

* * * * *